United States Patent [19]

Rasmussen et al.

[11] Patent Number: 4,728,963

[45] Date of Patent: Mar. 1, 1988

[54] SINGLE SHEET INK-JET PRINTER WITH PASSIVE DRYING SYSTEM

[75] Inventors: Steve O. Rasmussen; Larry A. Jackson; John D. Rhodes; David W. Pinkernell; J. Paul Harmon, all of Vancouver, Wash.

[73] Assignee: Hewlett-Packard Company, Palo Alto, Calif.

[21] Appl. No.: 24,278

[22] Filed: Mar. 11, 1987

[51] Int. Cl.[4] ........................ G01D 9/00; G01D 15/24; B65H 31/00; B41F 00/00

[52] U.S. Cl. ........................................ 346/25; 346/134; 271/209; 101/420

[58] Field of Search ............ 346/25, 134, 136, 140 IS, 346/140 PD; 271/161, 188, 209; 400/644, 645, 646; 101/417, 420, 421

[56] References Cited

U.S. PATENT DOCUMENTS

| | | | |
|---|---|---|---|
| 2,937,021 | 5/1960 | Keil | 271/188 |
| 4,313,669 | 2/1982 | Larson et al. | 271/209 X |
| 4,350,332 | 9/1982 | Knight | 271/188 |
| 4,444,521 | 4/1984 | Rickard et al. | 346/136 X |
| 4,598,298 | 7/1986 | Groenke et al. | 346/134 X |

*Primary Examiner*—E. A. Goldberg
*Assistant Examiner*—Patrick W. Foster
*Attorney, Agent, or Firm*—Bloor Redding, Jr.

[57] ABSTRACT

A novel ink-jet printer (10) is provided. The printer provides both paper supply tray (12) and paper collection tray (18) in the front (14) of the printer for ease of paper handling and reduced footprint. The paper collection tray is provided with a pair of opposed output rails (22) which support a sheet of paper (16*c*) during printing to permit ink on a sheet of paper (16*b*) previously printed to dry.

A paper handling mechanism is provided which eliminates a sheet pickup motor and associated elements. The paper handling mechanism is configured to pick off a sheet of paper from a stack of input paper, bring it around paper drive rollers (24) onto a platen (26), where the printing operation, employing a printhead cartridge (32) occurs.

The resulting printer is easy to manufacture, has reduced complexity by eliminating components in the paper drive mechanism and is lower in cost.

27 Claims, 10 Drawing Figures

SINGLE SHEET INK-JET PRINTER WITH PASSIVE DRYING SYSTEM

TECHNICAL FIELD

The present invention relates generally to ink-jet printing, and, more particularly, to a thermal ink-jet printer having a user-facing sheet feed and return assembly with mechanical simplicity and ink drying capability superior to printers without additional drying mechanisms and less expensive than printers with such mechanisms.

BACKGROUND ART

Hitherto, in the art of ink-jet printing, a common technique for feeding paper or other media to a printhead has involved the use of pinch or feed rollers which are specifically dedicated to the transferring of paper from a paper tray to the area of the printer between the printhead and the paper support member (platen) adjacent thereto. In this latter area, there is required an additional paper drive mechanism used to continue the transport of the paper past the printhead and printing zone and onto a paper collection tray or the like. Indeed, often a third drive is used with respect to transporting the paper to the paper collection tray.

Thus, the printer drive assembly requires a first drive mechanism for transporting paper out of the paper supply tray and a second paper drive mechanism for transporting paper past the printhead and into the paper collection tray. The requirement of multiple paper drive mechanisms adds to the cost and complexity of the ink-jet printer.

In addition, such prior ink-jet printers must deal with the problem of ink drying, unless specially coated paper is employed. If no mechanism is provided for drying the ink, then, with the rapid output of paper, one sheet is placed in the paper output tray before the ink on the sheet underneath has had an opportunity to dry, thereby causing smearing of the print on the lower sheet. One common mechanism is to provide some sort of drying means, such as a lamp or heater. However, such a requirement also adds to the complexity of the printer, since a power source, lamp or other heating device, and associated apparatus must be provided. Such apparatus also adds to the weight of the ink-jet printer.

It is desired to reduce the cost and complexity of the printer, while simplifying the components and their interactive association.

DISCLOSURE OF INVENTION

In accordance with the invention, an ink-jet printer is provided. The ink-jet printer comprises in associative combination:

(a) a paper supply means for providing a supply of a medium to be printed;

(b) a paper collection means for collecting printed medium;

(c) means for conveying a sheet of the medium from the paper supply means to the paper collection means through a printing zone;

(d) a printhead mounted on a printhead carriage adapted to move orthogonal to movement of the medium supported on a platen maintained in the printing zone;

(e) means for creating a reverse bow in the sheet of the medium for directing the sheet in a plane parallel to the printing zone just prior to entering the printing zone for maintaining flatness of the sheet;

(f) means for permitting ink on a previously-printed sheet of the medium to dry during printing of the next sheet of the medium, including a pair of opposed support rails positioned above the paper collection tray and of a width sufficient to support the sheet of the medium during printing but less than that required to support the sheet of the medium upon completion of the printing; and (g) means for controlling the medium-conveying and the printing operations.

The reverse bow is a change in direction of the sheet when the sheet comes off a drive roller and slides along the platen. This change in direction is caused by positioning the platen at an angle different than the tangent of the paper drive roller in the print zone.

A mechanically-actuated multiplexer is provided at least for initiating the conveying of the sheet from the paper supply tray to the print zone. The multiplexer includes a plurality of parallel multiplexer gears, each associated with a different function. Actuation of one such gear is accomplished by use of a trigger mechanism. The trigger is pressed upwardly by a follower through an appropriately-positioned interposer arm supported by the printhead carriage. Positioning of the interposer arm is provided by the control means.

The resulting ink-jet printer is easy to manufacture, has reduced complexity by eliminating components in the paper drive mechanism and by providing a novel paper drying apparatus, and is lower in cost.

BEST MODES FOR CARRYING OUT THE INVENTION

Figure 1:
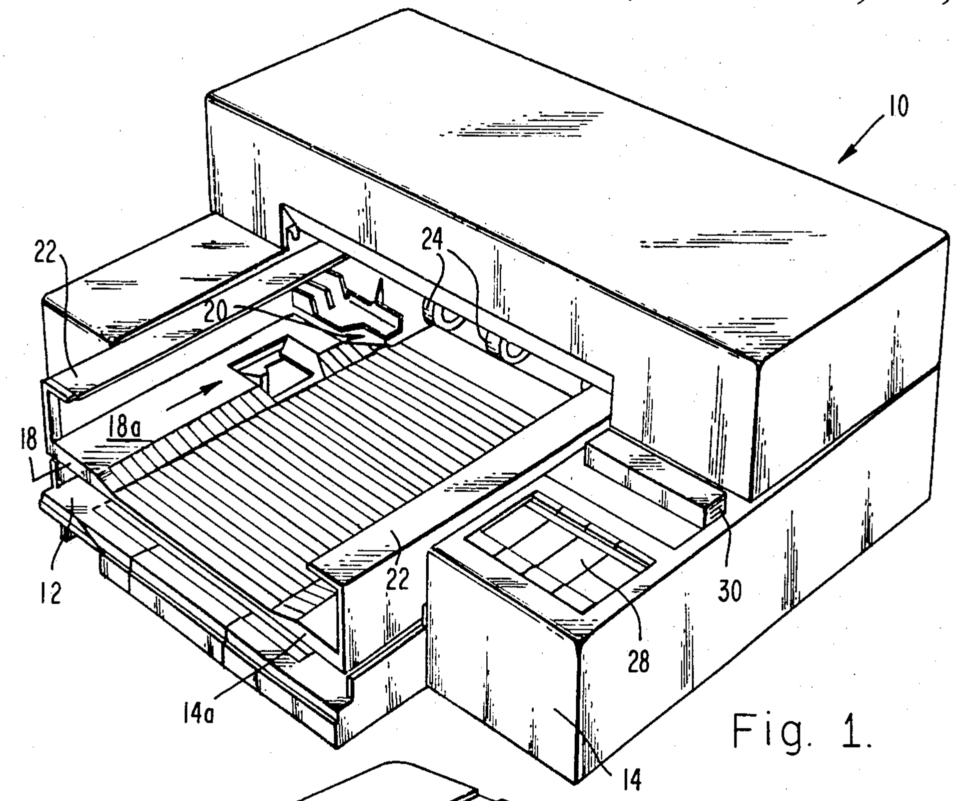
FIG. 1 is a perspective view of the novel ink-jet printer of the invention.

Referring now to the drawings wherein like numerals of reference designate like elements throughout, an ink-jet jet printer is depicted generally at 10. The novel ink-jet printer is characterized by several features unique to ink-jet printing and in particular to thermal ink-jet printing.

Figure 2:
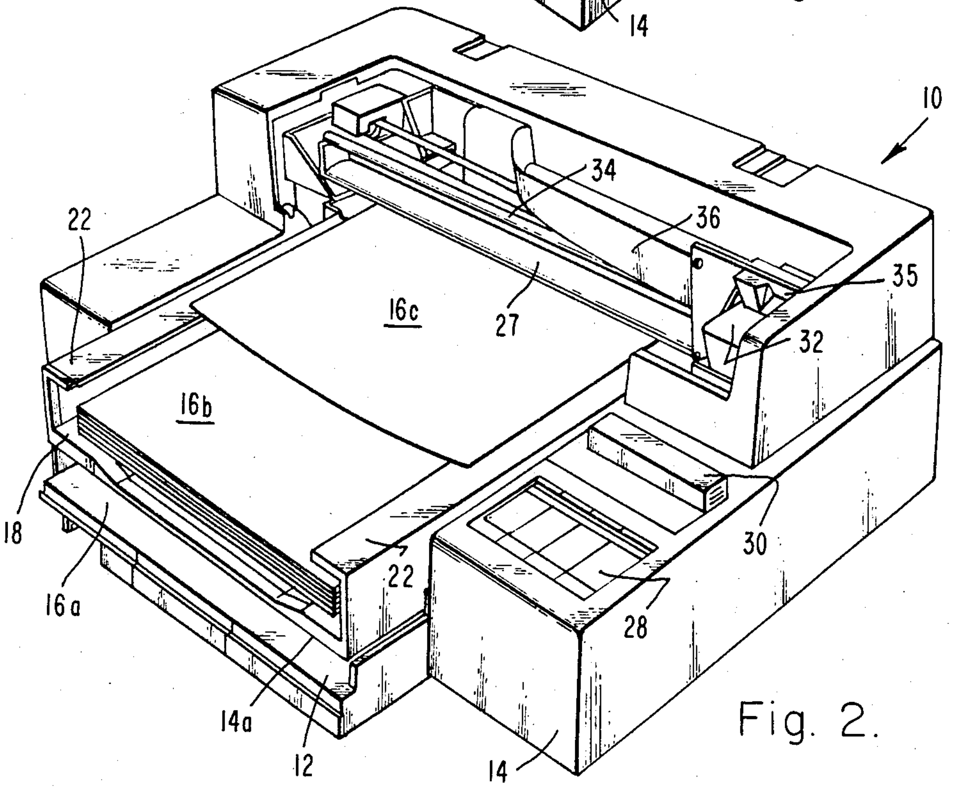
FIG. 2 is a view similar to that of FIG. 1, except that the top cover is removed, and a sheet of paper is shown during the printing operation prior to its deposit in the paper collection tray.

The first unique feature is seen in FIGS. 1 and 2. There, it will be observed that a paper input or supply tray 12 is provided in the front, or user-facing portion, 14 of the printer 10. The paper input tray 12 is configured to handle a substantial quantity of paper 16*a* or other medium for printing thereon. Also in the front 14 of the printer 10 is provided a paper output or collection tray 18. The paper output tray 18 is also configured to handle a substantial quantity of paper 16*b*.

There are two features to be noticed with regard to the paper output tray 18. First, a ramped slot 20 is provided near the rear of the paper output tray 18, sloping downward from the top of paper tray rails 18*a*. This slot permits the introduction of envelopes. Single sheets are simply placed on top of the input stack and the last sheet placed on the stack is the next sheet picked up.

Second, a pair of opposed output rails 22 is provided above the output tray 18. These output rails 22 along with the platen 26 (visible in FIGS. 3*c* and 3*d*) support a sheet of paper 16*c* during the printing operation to permit the ink on the sheet 16*b* underneath to dry. At the end of the printing cycle, when the sheet 16*c* is near the front 14*a* of the paper output tray 18, the platen 26 pivots down, eliminating the clamping of the sheet between the platen and paper guide 27. The sheet 16*c* then drops into the paper output tray of its own weight. Up until the completion of the printing cycle, the rear end of the paper is supported by the paper drive roller 24 and the platen 26 (shown in greater detail in FIG. 4 and discussed further below).

The front portion 14 of the printer 10 is also provided with a control panel 28, which is electrically associated with a microprocessor 29 for selection of various options relating to the printing operation. Such control operations, provided by presently-available microprocessors, are well-known in the prior art and form no part of this invention.

Similarly, a provision is made for insertion of one or more print format cartridges 30. Such print format cartridges permit the operator to select one or more print styles or fonts in order to customize the printed output. Such print style selection is well-known and forms no part of this invention.

Also shown in FIG. 2 is a printhead carriage 35, which travels on a guide rail 34 and paper guide 27, and printhead 32 which is connected by a flexible electrical flat ribbon 36 to the microprocessor 29. The microprocessor 29 controls motor 37, which provides movement of the printhead carriage 35. The printhead 32 is specifically designed for this ink-jet printer, and utilizes thermal ink-jet printing technology. However, the printer could operate with other ink-jet printheads if the printhead carriage interfaces are compatible, or with other carriage configurations. Further, reconfiguration of the printhead carriage 32 would permit the use of other ink-jet technologies, such as piezoelectric. Such reconfiguration is within the capabilities of one skilled in the art.

Figure 3A:
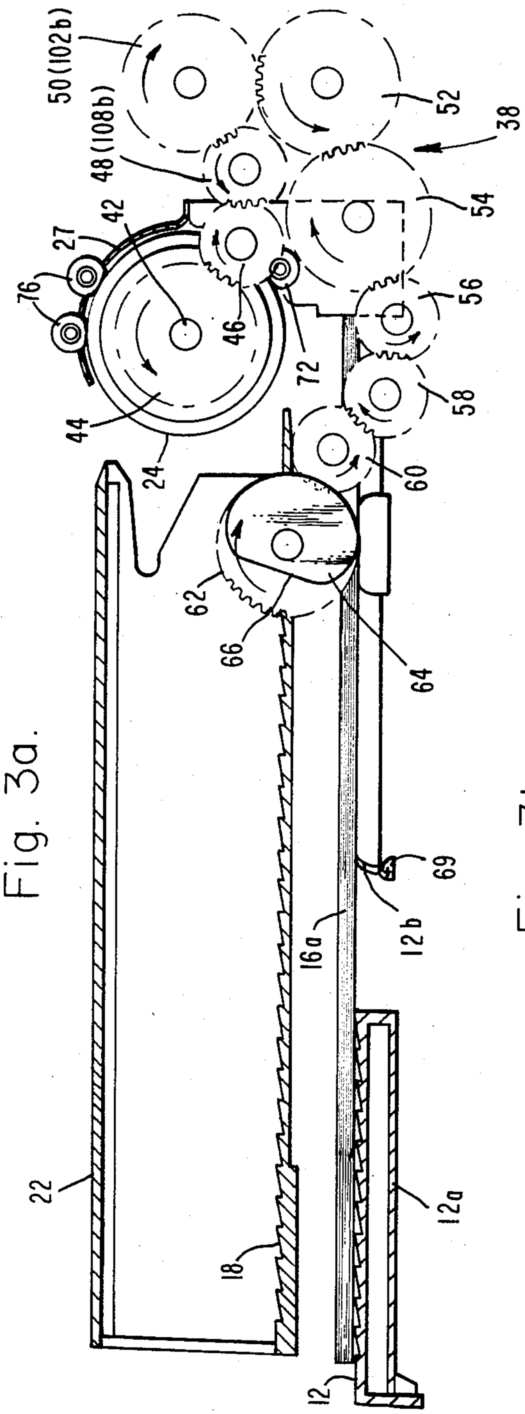
FIGS. 3*a–d*, in cross-section, depict the sequence of paper handling, from paper pick from the paper supply tray to paper deposit into the paper collection tray.

FIG. 3*a* depicts a gear train 38 used to transport paper 16*a* from the paper input tray 12 to the paper output tray 18. The gear train 38 is controlled by a paper drive motor 40 (shown in FIG. 4) through a paper drive shaft 42. On the paper drive shaft 42 are mounted the drive rollers 24.

The gear train 38 comprises ten gears 44–62 which are arranged in such a fashion as to transfer rotary motion of the paper drive shaft 42 from gear 44 thereon to a cam 64 associated with gear 62. The respective motions are shown in FIG. 3*a;* however, for simplicity, the gear train 38 is not shown in FIGS. 3*b–d*. The arrangement of gears 44–62 is depicted in FIG. 4. The operation of the gear train is initiated by engaging a mechanical multiplexer 100, the operation of which is described in greater detail below.

The gear train 38 rotates the cam 64, which, to a first approximation, has a flat portion 66. Specifically, the cam 64 has an approximate kidney bean shape to allow the function of bringing the paper into position for picking a sheet 16*c* thereof and returning the paper to an initial position.

To accomplish this motion, the paper input tray 12 comprises two separate portions, a paper support 12*a* and a pressure plate 12*b*, disposed behind the paper support and generally in the same plane. The pressure plate 12*b* is spring-loaded with a spring 68, such as a pair of coil springs or leaf spring. When contacted by the full diameter of the cam 64, the pressure plate 12*b* of the paper input tray 12 is maintained in the horizontal position and in the same plane as the paper support 12*a*, as shown in FIG. 3*a*.

Figure 3B:
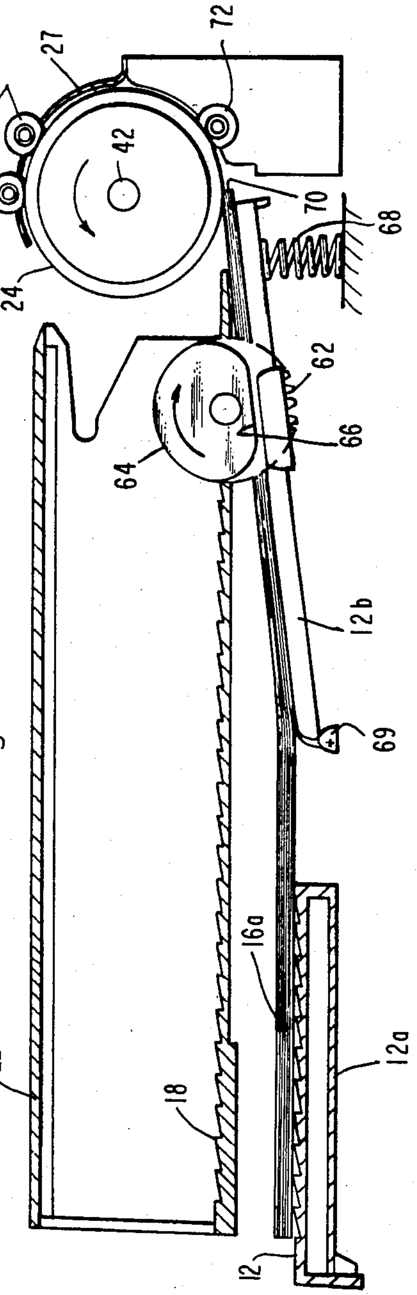
Figure 4:
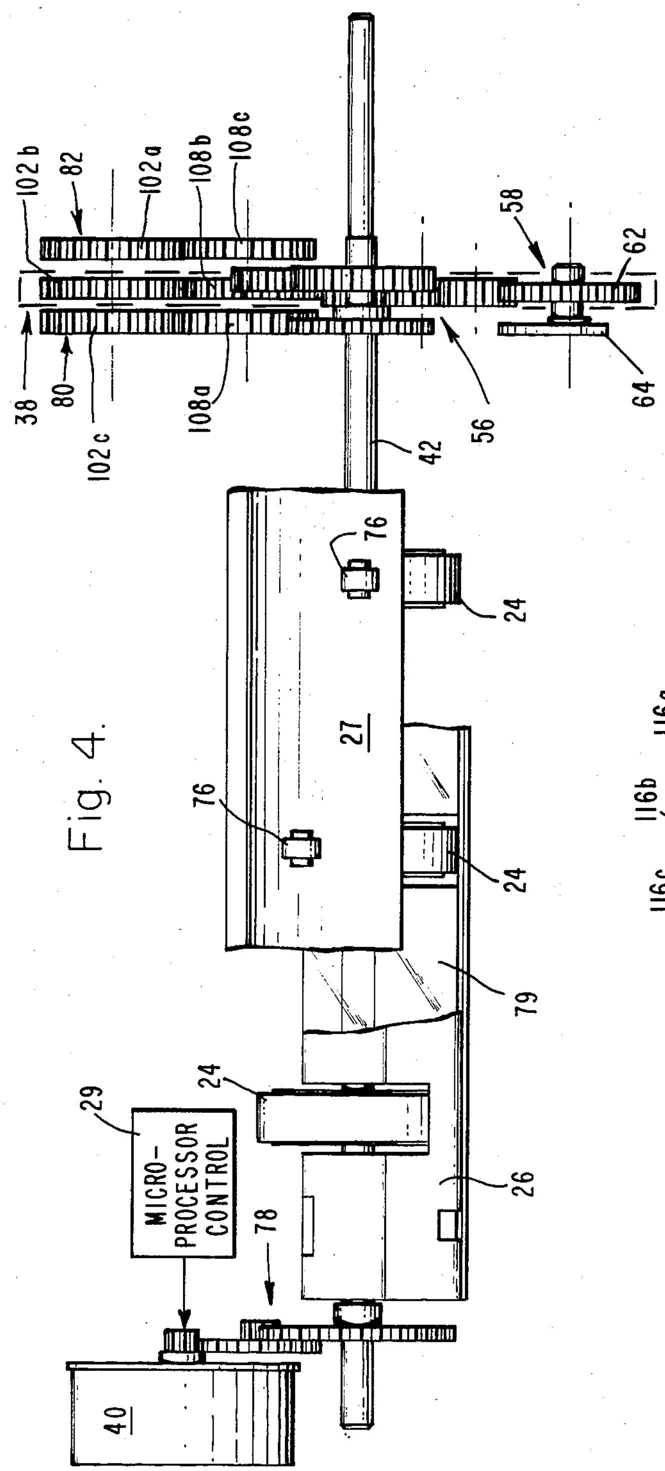
FIG. 4 is a front elevational view, partially broken away, of the paper drive train, including the paper drive motor, the paper drive roller, and the gear train used in the paper pick operation.

As the cam 64 rotates and the flat portion 66 comes in contact with the top surface of the pressure plate 12*b*, the spring 68 forces the pressure plate upward, rotating about a fixed axial pivot 69, thereby permitting the rear edge 70 of the paper 16*a* to be contacted by the paper drive rollers 24, as shown in FIG. 3*b*.

A single sheet of the paper 16*c* is picked off from the stack of input paper 16*a* and is fed between the paper drive roller 24 and first pinch wheels 72 associated therewith. Corner separators (not shown), conventional in the art of single sheet feeding, are advantageously employed in permitting a single sheet of paper to be picked. However, other sheet-separating technologies may also be utilized.

The sheet of paper 16*c* continues around the rollers 24, between paper guide 27 and a second set of pinch wheels 76, onto the platen 26, where printing of the sheet 16*c* is done (the printing zone).

Figure 3C:
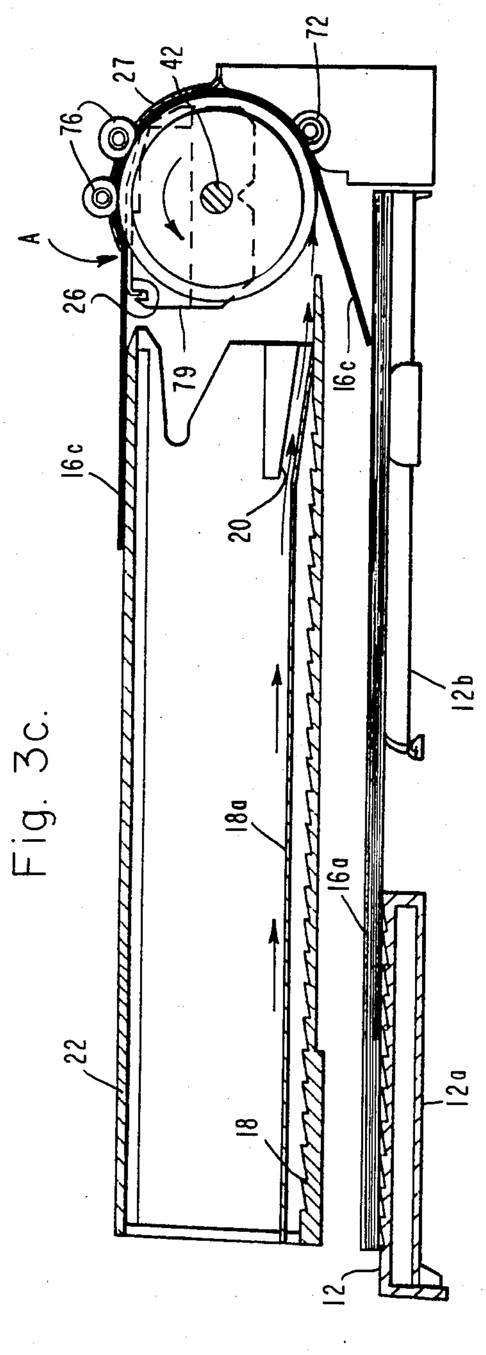
Figure 3D:
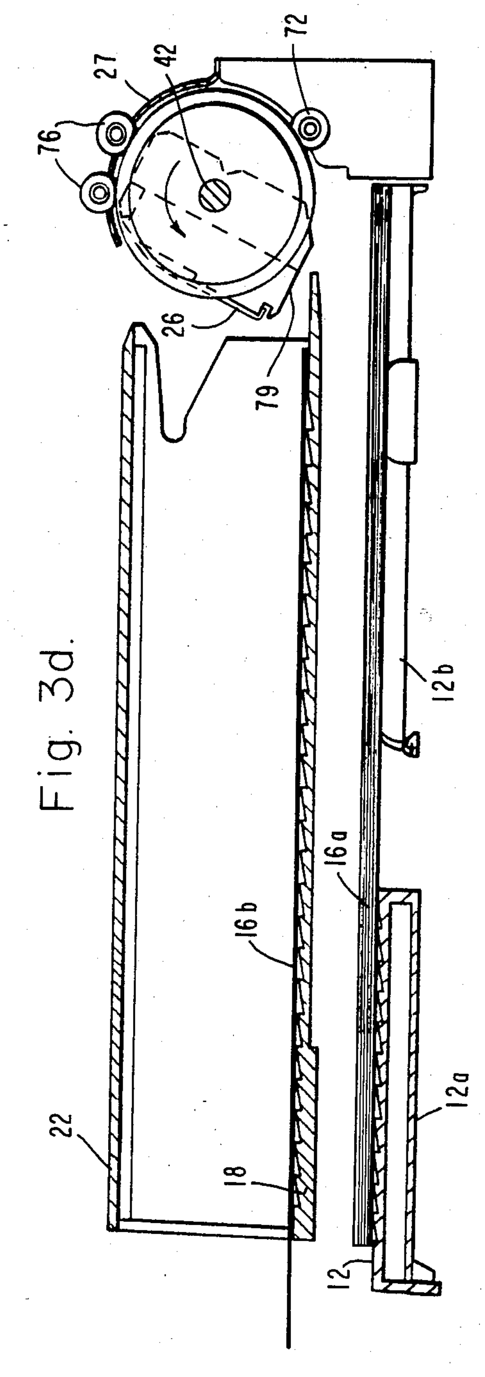

The transition from the guide 27 to the platen 26 results in a reverse bow of the paper 16*c* at point A (FIG. 3*c*). This reverse bow at A causes the paper 16*c* to lie flat along the platen 26 in the region that the printhead 32 passes over (the print zone A), thereby maintaining a constant and closely controlled gap between the printhead and the paper, which is required for ink-jet technology. The reverse bow is a change in direction of the paper when the paper comes off the drive roller 24 and slides along the platen 26. This change in direction is caused by positioning the platen 26 at an angle different than the tangent of the paper drive roller 24 at point A.

The reverse bow also causes the sheet 16*c* to bend transversely, thus preventing sheet bending longitudinally, which would otherwise allow it to fall between the rails 22.

If the gap between the printhead 32 and the paper 16*c* is too small, the printhead will smear the print, while if the gap is too large, poor print quality will result. The gap limitations depend on the particualar printhead employed. For many printheads, the gap is likely to be in the range of about 0,020 to 0,050 inch.

The gap between the printhead 32 (not shown in FIGS. 3*a–d*) and the paper 16*c* is kept constant over a range of media thickness, and preferably does not exceed about 0.030 inches for the printer disclosed herein. Use of a deformable material for the platen 26 to make it somewhat compliant permits slight deformation thereof to accommodate thicker paper and to maintain the desired narrow gap.

It will be appreciated that the shape of the cam 64 is selected to permit a sheet of paper 16*c* to enter into the guide-roller assembly. The condition must be met such that paper is picked properly and fed through the first set of pinch rollers 72 before the pressure plate 12*b* starts down. The paper stack size variable must be taken into account so that under all conditions, the above is met. The length of the paper is immaterial, since a sensor (not shown) senses both the top and the bottom edge of the paper. Finally, the cam 64 rotates through one complete revolution each time it is actuated by the mechanical multiplexer 100.

The paper 16*c* being printed rides along the top of the rails 22 until printing is completed. It will be appreciated that the width of the rails 22 is sufficient to support the sheet of paper 16*c* during printing, but insufficient to support the sheet upon removal of the support provided by the platen 26. The width of the rails 22 is selected to permit overlap thereof by a sheet 16*c* in the range of about $\frac{1}{8}$ to $\frac{3}{8}$ inch on each rail.

At the completion of printing, the platen 26 pivots downward, as shown in FIG. *3d*. The pivoting of the platen 26 is controlled through a second gear train 80. As with the cam 64, this gear train 80 completes one cycle each time it is actuated by the mechanical multiplexer 100.

The loss of support and reverse bow at the rear of the sheet of paper 16*c* is enough to cause the sheet of paper to fall of its own weight into the paper output tray 18, where it comprises output paper sheet 16*b*. During the time of printing, the ink on the sheet of paper 16*b* previously printed has been drying, and by the time the next printed sheet 16*c* falls of its own weight, the lower sheet has completely dried, thereby avoiding smearing of the ink thereon. Thus, it will be appreciated that no drying mechanism, with its associated parts and power requirements, is required in order to dry the ink of a justprinted sheet of paper.

The paper drive roller is segmented, comprising a plurality of wheels 24 disposed along the paper drive shaft 42. The segmented drive roller 24 perfoms two functions: first, it is able to pick paper from the input stack 12 as well as drive paper around to the print zone at A, and second, it allows the platen 26 to pivot after printing a page, since the platen fits in between the drive roller segments, as shown in FIG. 4.

Advantageously, the segmented drive roller 24 comprises three wheels, one near each side of the medium 16, offset about $\frac{1}{2}$ to $\frac{3}{4}$ inch to provide a buckle zone, and one in the center, thereby allowing the platen 26 to extend between the wheels 24 to provide the reverse bow. Also, the wheels 24 can be used to pick a sheet off the paper supply; a buckle zone is needed to pick such a sheet. This arrangement is to be compared to use of a solid paper drive roller customarily employed in the art.

The wheels 24 conveniently comprise a synthetic rubber material, suitable for driving paper.

Associated with each wheel 24 is a first pinch wheel 72 for gripping a sheet of paper 16*c* picked from the stack of paper 16*a*. Also associated with each wheel 24 is a second pinch wheel 76.

The pinch wheels 72, 76 comprise a compliant foam rubber. The pinch wheels 72, 76 hold the paper 16*c* against the paper drive rollers 24 as it transverses the nearly 180° around the drive roller. The middle pinch wheel 76 is set behind the other two in order to hold the paper to the drive rollers in a region close to an out of paper sensor (not shown).

The paper drive train is shown in FIG. 4, comprising the paper drive motor 40 mechanically coupled to the paper drive shaft 42 by a gear train 78. Three paper drive roll wheels 24 are disposed along the paper drive shaft 42.

The downward pivoting of the platen 26 (shown in FIG. *3d*) is controlled by an arm (not shown) on pivoting platen support 79 which contacts an offset pin (not shown) on a pivot gear (not shown). The pivot gear is coupled to the mechanical multiplexer 100 by a gear train 80.

The multiplexer 100 employed herein interacts with three gear trains, a gear train 38 for feeding a sheet of paper with the drive wheels, a gear train 80 for pivoting the platen 26, and a gear train 82 for activating a pump (not shown) for priming the printhead 32.

Figure 5:
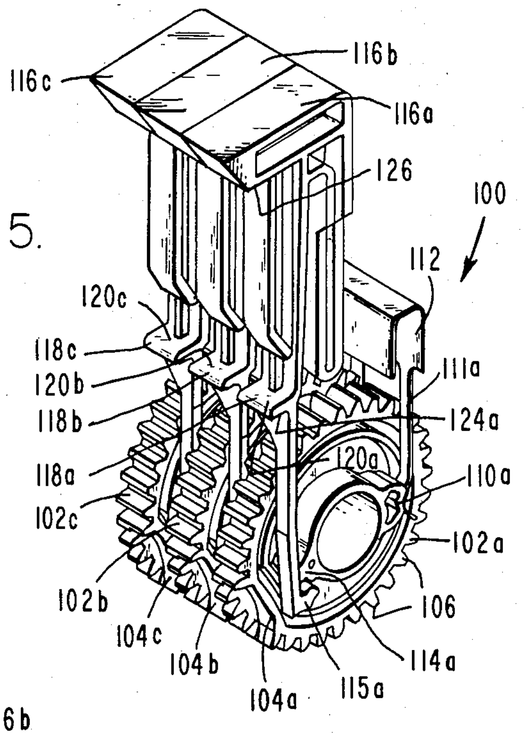
FIG. 5 is a perspective view of a portion of the mechanically actuated multiplexer used in the practice of the invention, including a plurality of multiplexer gears and triggers associated therewith.
Figure 6:
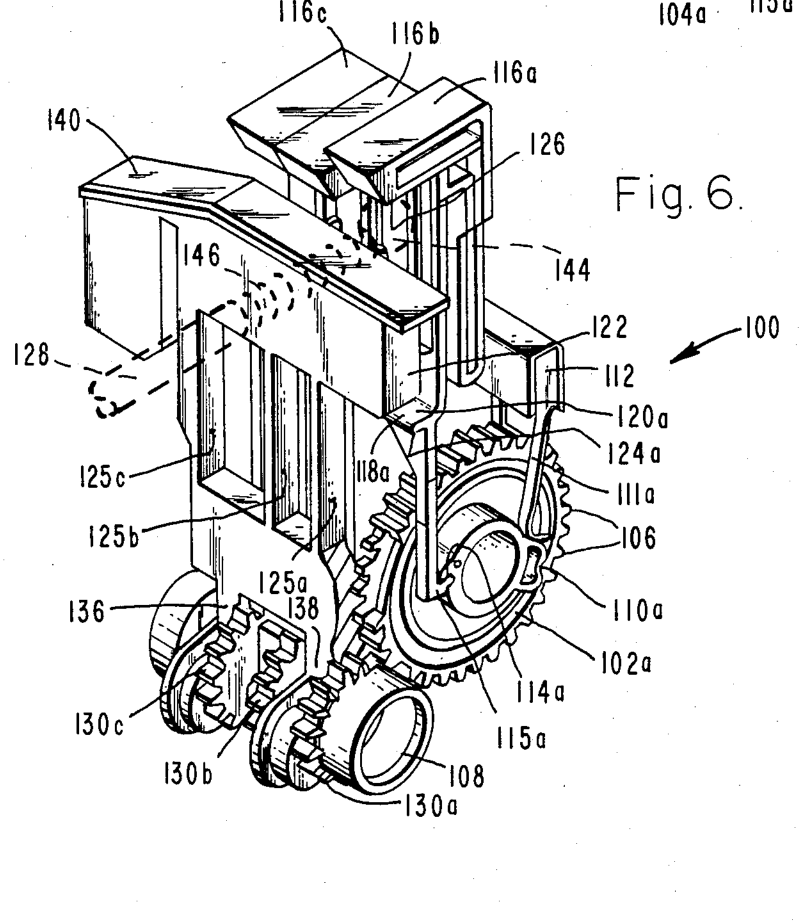
FIG. 6 is a perspective view of engagement of the multiplexer depicted in FIG. 5 with a follower mechanism for actuating the multiplexer gears of the multiplexer.

The following description of the multiplexer 100, shown in FIGS. 5 and 6, is directed to the associated parts that interact with one gear train. It will be appreciated that the associated parts that interact with the other gear trains are identical, and to the extent visible, are labled with identical numerals, but different letters (e.g., 100*a*, 100*b*, 100*c*).

The multiplexer 100 has three multiplexer gears 102*a–c*. Each multiplexer gear 102 has a cutout 104 in the teeth 106 which prevents engagement with a multiplexer pinion gear 108. A detent detail 110 allows an arm 111 of a multiplexer spring 112 to hold the multiplexer gear 102 in place. A hook detail 114 on the gear mates with a hook portion 115 on a trigger 116, thereby allowing the trigger to rotate the multiplexer gear 102 and meshing the multiplexer gear with the multiplexer pinion gear 108.

Three triggers 116*a–c* each have a hook detail 115 which mates to the hook portion 114 of the corresponding multiplexer gear 102. The trigger 116 has a lower ledge 118, the upper surface 120 of which allows a follower 122 to push the trigger into a down position, and the lower surface 124 of which allows the follower, via open portion 125, to slightly lift the trigger, which rotates the multiplexer gear 102 such that the cutout 104 and detent 110 are properly positioned. The trigger 116 also has an upper ledge 126 which is used by an interposer arm 128 to lift the trigger and start rotation of the multiplexer gear 102.

The multiplexer spring 112 is provided with three arms 111, which are engaged in the corresponding detents 110 in the multiplexer gears 102*a–c*.

The multiplexer pinion gear 108 comprises three gear segments 130 to mate with the corresponding multiplexer gear 102. Associated on the same axis as the multiplexer pinion gear segments 130 are two offset cam pins (not shown) which support the follower 122. The pinion gear 108 is coupled to the paper drive motor 40 through the paper drive shaft 42.

The follower 122 comprises two support arms 136, 138 which rest on the offset cam pins of the multiplexer pinion gear assembly 108. The follower 122 is also provided with a guide ledge 140 for supporting the interposer arm 128. Finally, the follower 122 has three sets of ledges to mate with the top and bottom surfaces 120, 124 of the lower ledge 118 of the trigger 116.

Figure 7:
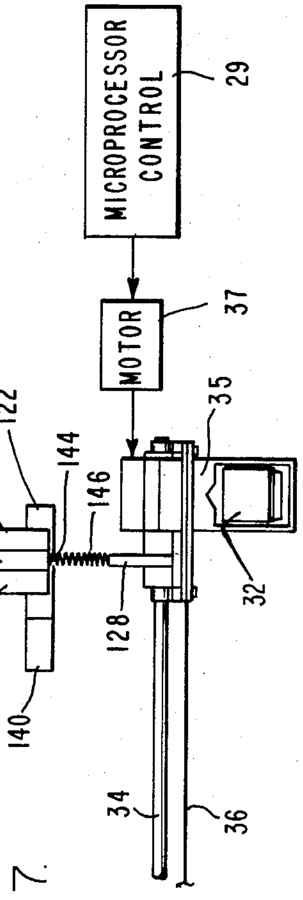
FIG. 7 is a top plan view of portion of the assembly for actuating the multiplexer gears, including an interposer arm mounted on the printhead carriage.

The interposer arm 128 is mounted on the printhead carriage 35, as shown in FIG. 7, and comprises an end effector 144, which transmits the motion of the follower 122 to a trigger 116 when the end effector is placed under a trigger, as shown in FIG. 6. The interposer arm 128 also includes a spring 146 to allow the end effector 144 to pass in front of the triggers 116*a*–*c* if the follower 122 is at the top of its motion.

In operation, the interposer arm 128 is placed under a trigger (here, 116*a* in FIG. 6; 116*b* in FIG. 7). Such placement is achieved by moving the printhead carriage 35 to the appropriate position, under control by the microprocessor 29.

The trigger 116*a* is lifted, causing multiplexer gear 102*a* to rotate. The rotating multiplexer gear 102*a* meshes with the multiplexer pinion gear segment 130*a*.

The interposer arm 128 is removed (by moving the printhead carriage 35 laterally).

The multiplexer gear 102*a* rotates for one revolution. During this time, the follower 122 pulls the trigger 116*a* back into the "down" position. The cutout 104*a* on the multiplexer gear 102*a* causes the pinion gear 108 to stop driving the multiplexer gear 102*a*. The follower 122 in the "up" position lifts the trigger 116*a* to position the multiplexer gear 102*a* in the detent position to complete the cycle.

As can be seen from the foregoing, any of three control features may be turned on mechanically, thereby eliminating the need for electronic control. The only electronic involvement is the proper placement of the printhead carriage 35 by the microprocessor 29. Of course, more or less multiplexer gear 102 may be employed, depending upon the number of functions it is desired to control.

The relationship between the multiplexer 100 depicted in FIGS. 5 and 6 and the gear trains 38, 80, 82 is shown in FIG. 4. In FIG. 3*a*, the reference numerals in parentheses (102*b* and 108*b*) are indicated to show the relationship of the multiplexer gear 102 and pinion gear 108 to the gear train 38.

INDUSTRIAL APPLICABILITY

The novel single sheet ink-jet printer 10 of the invention is useful for a variety of printing applications.

Thus, an ink-jet printer having reduced cost and complexity, and combining the paper moving operation into one mechanism and providing for adequate drying of sheets, is provided. It will be clear to those skilled in the art that several changes and modifications of an obvious nature may be made without departing from the spirit of the invention, and all such changes and modifications are considered to fall within the scope of the invention as defined by the appended claims.

What is claimed is:

1. An ink-jet printer comprising in associative combination:

(a) a paper supply means for providing a supply of a medium to be printed;

(b) a paper collection means for collecting printed medium;

(c) means for conveying a sheet of said medium from said paper supply means to said paper collection means through a printing zone;

(d) a printhead mounted on a printhead carriage adapted to move orthogonal to movement of said medium for printing on said medium supported on a platen maintained in said printing zone;

(e) means for creating a reverse bow in said sheet of said medium for directing said sheet in a plane parallel to said printing zone just prior to entering said printing zone for maintaining flatness of said sheet;

(f) means for permitting ink on a previously-printed sheet of said medium to dry during printing of a next sheet of said medium, including a pair of opposed support rails positioned above said paper collection means and of a width sufficient to support said sheet of said medium during printing but less than that required to support said entire sheet upon completion of said printing; and (g) means for controlling said medium-conveying and said printing operations.

2. The ink-jet printer of claim 1 wherein said sheet conveying means includes a mechanism for picking said sheet of said medium from the rear portion of said paper supply means, a rotatable paper drive shaft having mounted thereon a plurality of paper drive roll wheels fixedly mounted thereon, means for rotating said paper drive shaft, and pinch wheel means for maintaining said sheet of said medium against said paper drive roll wheels.

3. The ink-jet printer of claim 1 wherein said mechanism for picking said sheet of said medium includes an articulating portion of said paper supply means, adapted to pivot about an axial pivot, a spring means for urging said articulating portion upward toward said paper drive rollers, a cam comprising a truncated disk, the disk portion of which urges said articulating portion downward and the truncated portion of which permits said upward movement of said articulating portion, and a gear train for translating rotary motion of said drive shaft to said cam.

4. The ink-jet printer of claim 1 further including means for pivoting said platen downward at the completion of said printing of each said sheet.

5. The ink-jet printer of claim 1 wherein said platen is deformable to accommodate a range of media thicknesses.

6. The ink-jet printer of claim 1 further including a mechanically-actuated multiplexer means for at least initiating pick-up of said sheet.

7. The ink-jet printer of claim 6 wherein said multiplexer means comprises a plurality of multiplexer gears, means for preventing rotation of said multiplexer gears until initiated by initiation means, trigger means for initiating rotation of said multiplexer gears for one revolution, and initiation means for activating said trigger means.

8. The ink-jet printer of claim 7 wherein said initiation means includes a set of pinion gears, each associated with a multiplexer gear, a follower associated with cams coaxial with said pinion gears, and an interposer arm on said printhead carriage, which is adapted to be moved into position between said follower and said trigger means by said controlling means.

9. The ink-jet printer of claim 8 wherein said multiplexer gears are each provided with a cutout portion to prevent engagement of said multiplexer gears by said pinion gears, with a detent detail adapted to interact with a multiplexer spring to stop rotation of said multiplexer gear after one revolution, and with a hook detail for actuation by said trigger means.

10. An ink-jet printer comprising in associative combination:

(a) a paper supply means for providing a supply of a medium to be printed;

(b) a paper collection means for collecting printed medium;

(c) means for conveying a sheet of said medium from said paper supply means to said paper collection means through a printing zone, said sheet conveying means including a mechanism for picking said sheet of said medium from the rear portion of said paper supply means, a rotatable paper drive shaft having mounted thereon a plurality of paper drive roll wheels fixedly mounted thereon, means for rotating said paper drive shaft, and pinch wheel means for maintaining said sheet of said medium against said paper drive roll wheels;

(d) a pivotable platen in said print zone including means for pivoting said platen downward at the completion of printing each said sheet;

(e) a printhead mounted on a printhead carriage adapted to moved orthogonal to movement of said medium for printing on said medium supported on said platen;

(f) means for creating a reverse bow in said sheet of said medium for directing said sheet in a plane parallel to said printing zone just prior to entering said printing zone for maintaining flatness of said sheet;

(g) means for permitting ink on a previously-printed sheet of said medium to dry during printing of a next sheet of said medium, including a pair of opposed support rails positioned above said paper collection means and of a width sufficient to support said sheet of said medium during printing but less than that required to support said sheet of said medium upon downward pivoting of said platen at the completion of said printing;

(h) mechanically-actuated multiplexer means for at least initiating pick-up of said sheet and for initiating said downward pivoting of said platen; and (i) means for controlling said medium-conveying and said printing operations.

11. The ink-jet printer of claim 10 provided with a user-facing paper supply tray and a user-facing paper collection tray.

12. The ink-jet printer of claim 11 wherein said paper collection tray is maintained above said paper supply tray in tandem arrangement.

13. The ink-jet printer of claim 10 wherein said mechanism for picking said sheet of said medium includes an articulating portion of said paper supply means, adapted to pivot about an axial pivot, a spring means for urging said articulating portion upward toward said paper drive rollers, a cam comprising a truncated disk, the disk portion of which urges said articulating portion downward and the truncated portion of which permits said upward movement of said articulating portion, and a gear train for translating rotary motion of said drive shaft to said cam.

14. The ink-jet printer of claim 10 wherein said platen is deformable to accommodate a range of media thicknesses.

15. The ink-jet printer of claim 10 wherein said multiplexer means comprises a plurality of multiplexer gears, means for preventing rotation of said multiplexer gears until initiated by initiation means, trigger means for initiating rotation of said multiplexer gears for one revolution, and initiation means for activating said trigger means.

16. The ink-jet printer of claim 15 wherein said initiation means includes a set of pinion gears, each associated with a multiplexer gear, a follower associated with cams coaxial with said pinion gears, and an interposer arm on said printhead carriage, which is adapted to be moved into position between said follower and said trigger means by said controlling means.

17. The ink-jet printer of claim 16 wherein said multiplexer gears are each provided with a cutout portion to prevent engagement of said multiplexer gears by said pinion gears, with a detent detail adapted to interact with a multiplexer spring to stop rotation of said multiplexer gear after one revolution, and with a hook detail for actuation by said trigger means.

18. An ink-jet printer comprising in associative combination:

(a) a user-facing paper supply tray for providing a supply of a medium to be printed;

(b) a user-facing paper collection tray for collecting printed medium, said paper collection tray maintained above said paper supply tray in tandem arrangement;

(c) means for conveying a sheet of said medium from said paper supply tray to said paper collection tray through a printing zone, said means including a mechanism for picking said sheet of said medium from the rear portion of said paper supply tray, a rotatable paper drive shaft having mounted thereon a plurality of paper drive roll wheels fixedly mounted thereon, means for rotating said paper drive shaft, pinch wheel means for maintaining said sheet of said medium against said paper drive roll wheels, said mechanism for picking said sheet of said medium including (1) an articulating portion of said paper supply tray, adapted to pivot about an axial pivot, (2) a spring means for urging said articulating portion upward toward said paper drive rollers, (3) a cam comprising a truncated disk, the disk portion of which urges said articulating portion downward and the truncated portion of which permits said upward movement of said articulating portion, and (4) a gear train for translating rotary motion of said drive shaft to said cam;

(d) a pivotable platen in said print zone adapted to pivot downward at the completion of printing each said sheet, said pivotable platen including means for pivoting said platen downward at the completion of said printing;

(e) an ink-jet printhead mounted on a printhead carriage adapted to move orthogonal to movement of said medium for printing on said medium supported on said platen;

(f) means for creating a reverse bow in said sheet of said medium for directing said sheet in a plane parallel to said printing zone just prior to entering said printing zone for maintaining flatness of said sheet;

(g) means for permitting ink on a previously-printed sheet of said medium to dry during printing of a next sheet of said medium, including a pair of opposed support rails positioned above said paper collection tray and of a width sufficient to support said sheet of said medium during printing but less than that required to support said sheet of said medium upon downward pivoting of said platen at the completion of said printing;

(h) mechanically-actuated multiplexer means for at least initiating pick-up of said sheet and for initiating said downward pivoting of said platen; and (i) microprocessor means for controlling said medium-conveying and said printing operations.

19. The ink-jet printer of claim 18 wherein a thermal ink-jet printhead is mounted on said printhead carriage.

20. The ink-jet printer of claim 18 wherein said multiplexer means comprises a plurality of multiplexer gears, means for preventing rotation of said multiplexer gears until initiated by initiation means, trigger means for initiating rotation of said multiplexer gears for one revolution, and initiation means for activating said trigger means.

21. The ink-jet printer of claim 20 wherein said initiation means includes a set of pinion gears, each associated with a multiplexer gear, a follower associated with cams coaxial with said pinion gears, and an interposer arm on said printhead cartridge, which is adapted to be moved into position between said said follower and said trigger means by said controlling means.

22. The ink-jet printer of claim 21 wherein said multiplexer gears are each provided with a cutout portion to prevent engagement of said multiplexer gears by said pinion gears, with a detent detail adapted to interact with a multiplexer spring to stop rotation of said multiplexer gear after one revolution, and with a hook detail for actuation by said trigger means.

23. An ink-jet printer comprising in associative combination:

(a) means for conveying a sheet of a medium through a printing zone which includes a platen;

(b) a printhead for printing on said medium supported on said platen, said printhead mounted in a printhead carriage adapted to move orthogonal to movement of said medium; and (c) means for providing a reverse bow in said sheet of said medium for directing said sheet in a plane parallel to said printing zone just prior to entering said printing zone for maintaining flatness of said sheet.

24. A mechanically-actuated multiplexer means comprising at least one multiplexer gear, a pinion gear associated with said multiplexer gear, means for preventing rotation of said at least one multiplexer gear until initiated by initiation means, trigger means for initiating rotation of said at least one multiplexer gear for one revolution, and initiation means for activating said trigger means.

25. The multiplexer of claim 24 wherein said initiation means includes a follower associated with a cam coaxial with said pinion gear, and means adapted to be moved into position between said said follower and said trigger means by controlling means.

26. The multiplexer of claim 25 wherein said at least one multiplexer gear is provided with a cutout portion to prevent engagement of said at least one multiplexer gear by said pinion gear, with a detent detail adapted to interact with a multiplexer spring to stop rotation of said at least one multiplexer gear after one revolution, and with a hook detail for actuation by said trigger means.

27. The multiplexer of claim 24 comprising a plurality of multiplexer gears, each associated with a pinion gear.

* * * * *